Nov. 3, 1959  F. W. ARMSTRONG  2,911,517
TWIN ELECTRODE WELDING METHOD AND APPARATUS
Filed Dec. 10, 1957  4 Sheets-Sheet 1
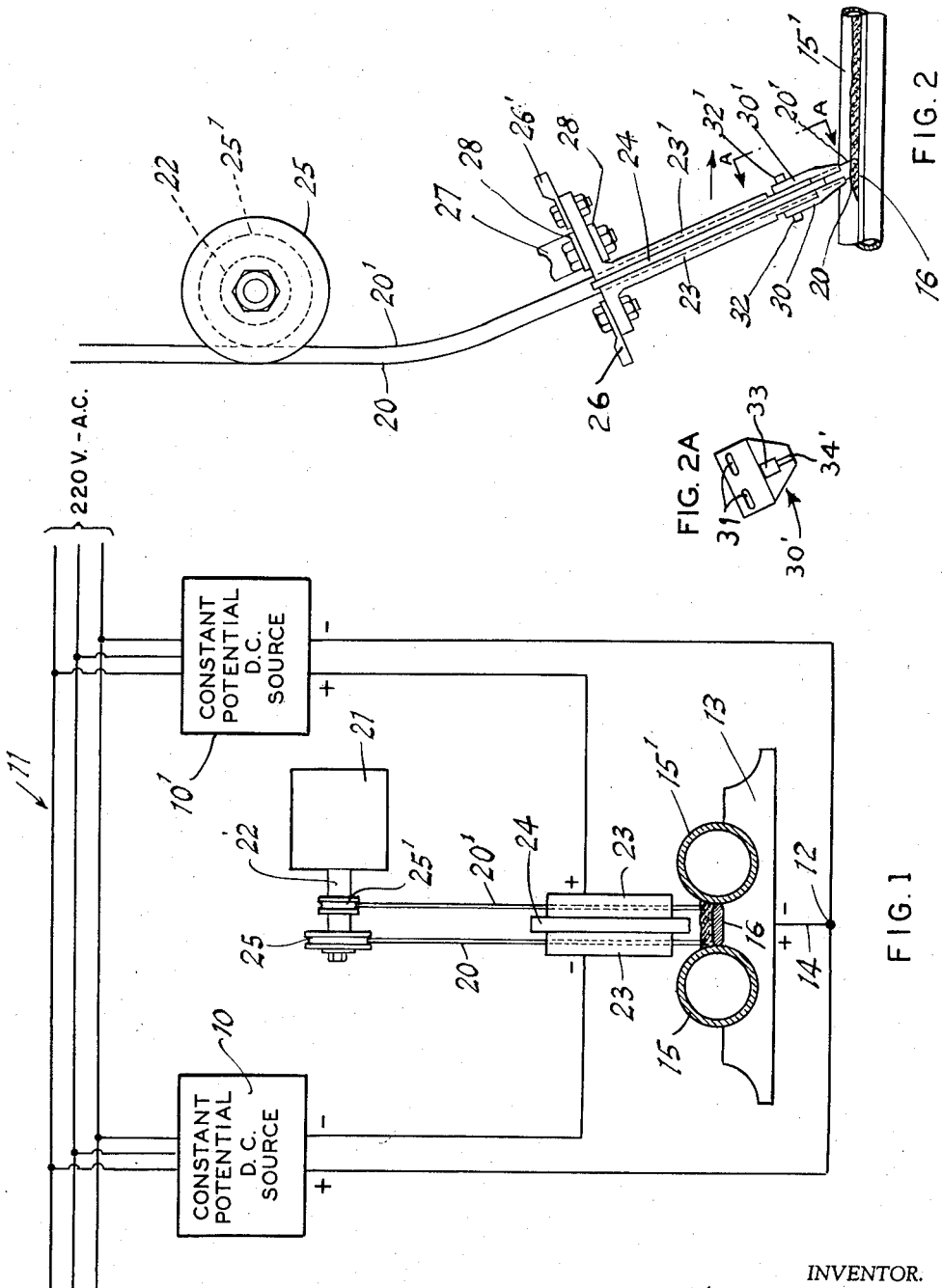
INVENTOR.
Frank W. Armstrong
BY
ATTORNEY

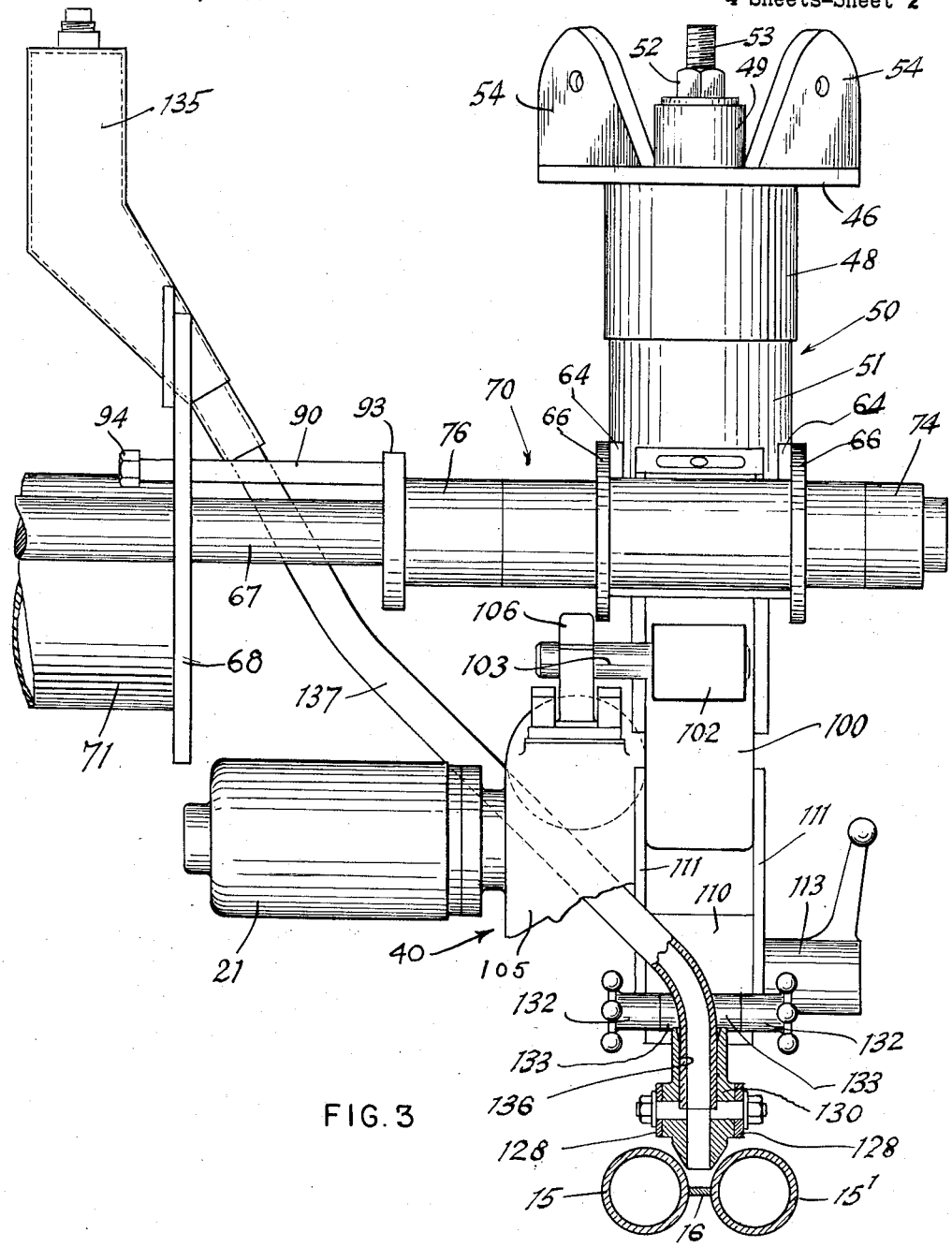

Nov. 3, 1959  F. W. ARMSTRONG  2,911,517
TWIN ELECTRODE WELDING METHOD AND APPARATUS
Filed Dec. 10, 1957  4 Sheets-Sheet 3
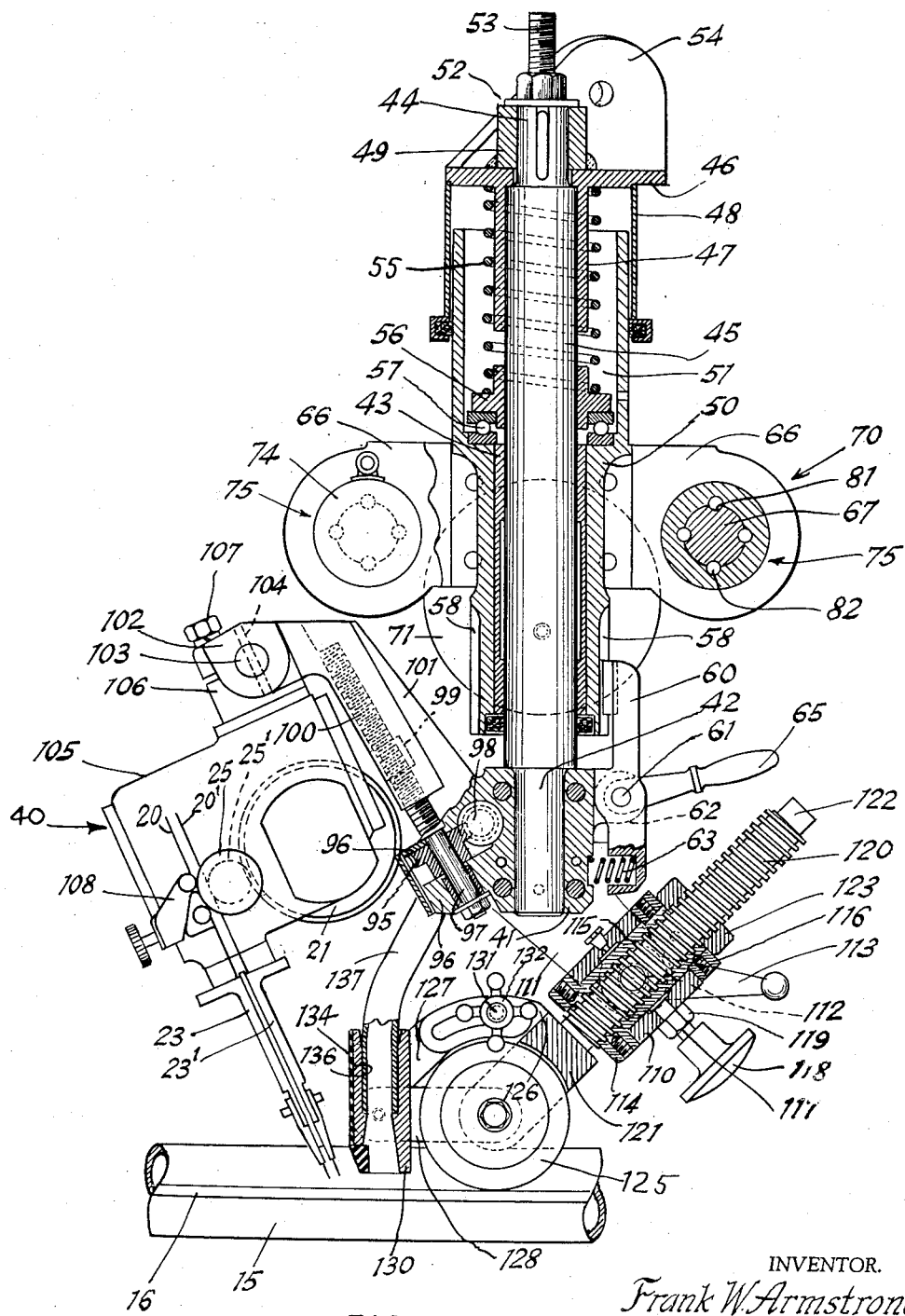
FIG.4
INVENTOR.
Frank W. Armstrong
BY
ATTORNEY Nov. 3, 1959 F. W. ARMSTRONG 2,911,517
TWIN ELECTRODE WELDING METHOD AND APPARATUS
Filed Dec. 10, 1957 4 Sheets-Sheet 4
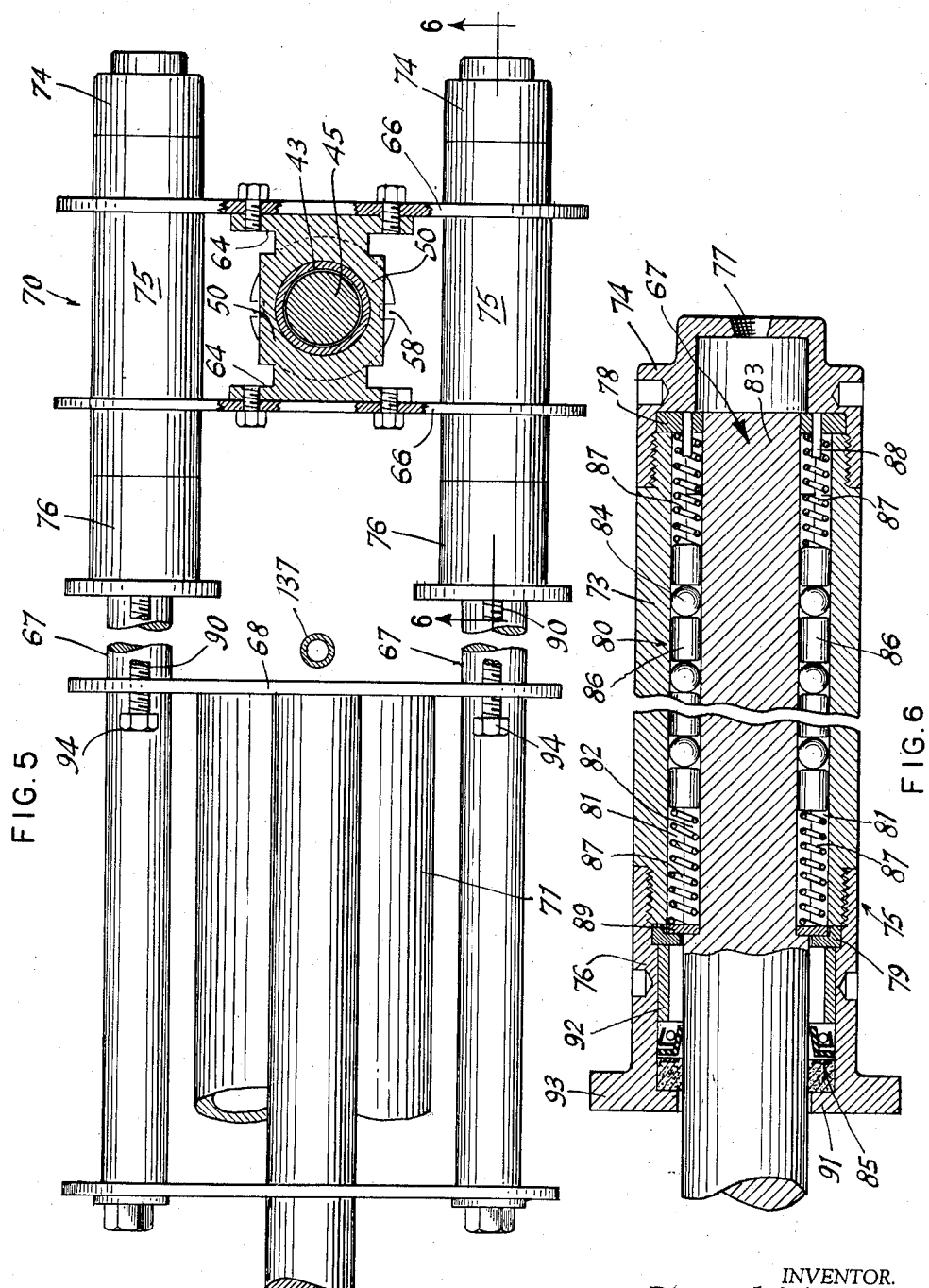
INVENTOR.
Frank W. Armstrong
BY
*J. P. Moran*
ATTORNEY

United States Patent Office 2,911,517
Patented Nov. 3, 1959

2,911,517

TWIN ELECTRODE WELDING METHOD AND APPARATUS

Frank W. Armstrong, Barberton, Ohio, assignor to The Babcock & Wilcox Company, New York, N.Y., a corporation of Delaware Application December 10, 1957, Serial No. 701,809

16 Claims. (Cl. 219—125)

This invention relates to submerged arc welding and, more particularly, to a novel method of and apparatus for high speed submerged arc welding utilizing a pair of fusible metal electrodes electrically interconnected and conjointly operated in a novel manner and fed to the work through a layer of welding flux of a predetermined fineness.

In submerged arc welding using alternating current, it is normally not possible to attain speeds greatly in excess of 30 to 40 inches per minute. On the other hand, when a constant potential direct current source is employed for submerged arc welding, much higher welding speeds are attainable. However, in this case the effective speeds attainable are limited by characteristics of the granular flux and by the magnetic blow characteristic of the use of a direct current source.

For example, submerged arc granular flux manufacturers usually supply a relatively coarse-grained flux (12 x 150 mesh) for high speed welding. (By the expression "12 x 150 mesh" is meant that all the flux passes through a 12-mesh screen and is retained on a 150 mesh screen.) The speed of welding using this size flux is limited by the occurrence of irregularities of the weld deposit, which are believed to be due to the relatively short length of time the flux is at the welding temperature.

As an important feature of this invention, it has been found that using a finer submerged arc granular welding flux in the size range of 30 x 150 mesh to 50 x 150 mesh, and preferably 40 x 150 mesh, permits welding speeds of 72 inches per minute or better. Optimum results are obtained with the 40 x 150 mesh flux. The increase in welding speed is of the order of 100 percent.

This range of flux sizes is critical in that, while greatly increased welding speeds are possible using flux within this size range, the increase in speed is most pronounced with the 40 x 150 mesh flux and the speed tapers off gradually when the size is progressively changed toward 30 x 150 mesh or toward 50 x 150 mesh, the attainable speed decreasing sharply beyond the limits of the range.

When welding a seam using direct current arc welding, the magnetic effects and the change in length and direction of the ground current path through the work combined to produce an unstable arc, particularly where relatively high current densities are employed. As is well known to those skilled in the art, travelling or rolling grounds are impractical and the ground or return line is usually clamped or brazed to a fixed point on the work. Particularly in the case of long welds, this means that the length of the ground path, and its impedance, constantly change during welding. In addition, the current returning through the work from the arc to the ground connection may take any one of a number of substantially unpredictable paths through the work.

The instability of the arc due to magnetic blow is accentuated by the varying impedance of the return path, particularly with high current densities. As a result, it is not possible, without the use of special equipment, to produce a continuous, evenly deposited weld with uniform penetration, particularly when welding along a groove or in a similar laterally confined space. The special equipment, usually magnetic in nature, available to counteract magnetic arc blow is complicated in design and difficult, if not impossible, to use for welding in a confined space.

The foregoing difficulties are accentuated when using a pair of electrodes welding along a single seam or in closely adjacent welding seams or grooves, as is sometimes necessary or desirable when it is desired to decrease the overall welding time or in special constructions involving the simultaneous joining of three components by a pair of welded seams. If the two arcs are connected in parallel to the same current source, the like polarity arcs tend to repel each other, making penetration difficult to effect.

As a most important feature of the present invention, it has been found that the foregoing difficulties can be eliminated and effective welding with pairs of closely spaced arcs accomplished by connecting each arc to a separate source of substantially constant potential direct current with each source having one terminal connected to an electrode and the other terminal connected to a common junction at the workpiece, one electrode being negative relative to the work (straight polarity) and the other electrode being positive relative to the work (reverse polarity).

With this arrangement of the electrodes, the ground current is very substantially reduced with corresponding reduction in the magnetic blow due to ground current. As the two arcs are of inverse polarity, they no longer repel each other but attract due to their magnetic field relationship. Thus, welding in a confined space is facilitated.

By increasing the feed rate of the straight polarity electrode relative to that of the reverse polarity electrode, the ground current can be reduced to essentially zero. The electrical energy usually transmitted from the arcs to ground is utilized in melting the straight polarity electrode. By a relative increase of substantially 40 percent in the feed rate of the straight polarity electrode, the ground current is reduced to zero and the current in each arc is balanced. This results in the equivalent of a true series arc arrangement fed from separate current sources and free of problems due to arc blow and variation in the length and direction of the ground current path.

As a corollary, it has been found advantageous to have the reverse polarity electrode lead the straight polarity electrode along the seam by a slight amount, as the straight polarity electrode operates more efficiently with some preheat supplied from the reverse polarity electrode.

In further accordance with the invention, both electrodes are fed by a single welding head having a common feed roller drive for the two electrodes. The feed roller for the straight polarity electrode is made of larger diameter, e.g. substantially 40 percent, than the feed roller for the reverse polarity electrode. A common feed nozzle is provided, with each electrode insulated from the other, and the end of the nozzle is made laterally adjustable to provide for adjustment of the spacing of the electrodes relative to each other and to the work.

For an understanding of the invention principles, reference is made to the following description of typical embodiments thereof as illustrated in the accompanying drawings. In the drawings:

Fig. 1 is a schematic front elevation view of welding apparatus embodying the invention, the workpieces being shown in section;

Fig. 2 is a partial side view of one form of the apparatus;

Fig. 2A is a view on the line A—A of Fig. 2;

Fig. 3 is a front elevation view of an embodiment of the invention actually used in practicing the same;

Fig. 4 is a side elevation view, partly in section, of the apparatus of Fig. 3;

Fig. 5 is a plan view, partly in section, of a cantilever slide support for the apparatus of Figs. 3 and 4; and Fig. 6 is a longitudinal sectional view on the line 6—6 of Fig. 5.

Referring to Figs. 1, 2 and 2A, the welding current is supplied from a pair of constant potential sources of direct current illustrated at 10 and 10'. In the illustrative example, these sources are three-phase rectifiers with their primary windings connected, in phase with each other, to a three-phase A.C. supply line 11. The positive terminal of source 10 and the negative terminal of source 10' are commonly connected to a junction 12 connected to work support or jig 13 by a ground conductor 14. By way of example only, the work is illustrated as a pair of metal tubes 15, 15' arranged to be welded to a metal web or spacer strip 16.

The weld beads joining each longitudinal edge of web 16 to tubes 15, 15' are deposited simultaneously from a pair of electrodes 20, 20' commonly driven from a single feed motor 21 driving a feed roll shaft 22 on which are secured feed rollers 25, 25' for electrodes 20, 20' respectively. The welding current is delivered to the electrodes by conductive metal contact shoes 23, 23' electrically insulated from each other by insulation 24. The current is conducted to shoes 23, 23' through terminals 26, 26' electrically connected thereto, and the shoes are supported by a bracket 27 mechanically connected to one contact shoe and electrically insulated therefrom as indicated at 28.

It will be noted that electrode 20 is connected to the negative output terminal of source 10, and that electrode 20' is connected to the positive output terminal of source 10'. Hence, electrode 20 is negative relative to the work, and electrode 20' is positive relative to the work. Accordingly, electrode 20 is connected in straight polarity and electrode 20' is connected in reverse polarity.

Feeding roller 25 is substantially larger in diameter than feeder roller 25'. Thus, the straight polarity electrode 20 has a feed rate substantially greater than that of the reverse polarity electrode 20'. In a specific example, if the diameter of roller 25 is 42 percent larger than the diameter of roller 25' the ground current is reduced to essentially zero.

As will be observed from Fig. 2, reverse polarity electrode 20' has a slight lead, in the direction of movement along the work, over straight polarity electrode 20. Contact shoes 23, 23' are provided with conductive metal electrode guide tips 30, 30', the latter being shown in Fig. 2A. The guide tips have slotted openings, such as 31', for receiving bolts 32, 32' securing the tips to the contact shoes, and are formed with openings, such as 33' to receive an electrode guide tube, and a passage, such as 34', for the electrode. The slotted openings provide for relative lateral adjustment of the guide tips to adjust the lateral spacing of electrodes 20, 20'.

The advantages of the described arrangement in reducing ground current will be recognized from the following. With reverse polarity electrode 20' operating at 460 amperes and straight polarity electrode 20 operating at 380 amperes, the measured ground current was 100 amperes. With both electrodes connected in reverse polarity and operating at 450 amperes, the measured ground current was equal to the sum of the electrode currents, or 900 amperes. In the first illustration, wherein the ground current was 100 amperes, the potential was 23 volts, thus representing 2300 watts. This 2300 watts was transferred to heat in the combined arcs by increasing the relative feeding rate of electrode 20 by substantially 40 percent, and the ground current was reduced to essentially zero.

Figs. 3 through 6 illustrate a practical embodiment of welding apparatus incorporating the principles of the invention. For illustrative purposes only, the apparatus is again shown as arranged to simultaneously weld opposite edges of a strip 16 to tubes 15, 15'. In general, the welding head of the apparatus of Figs. 3 through 6 is mounted on a support, such as a column, which has a vertical floating mounting on a second support, or carriage, which has a horizontal floating mounting laterally of the direction of welding. Thereby the welding apparatus can readily "float" along the work as directed by a work engaging guiding means.

More specifically, a welding head 40, which is fundamentally similar to that illustrated schematically in Figs. 1, 2 and 2A is adjustably supported on a split collar 41 clamped on the lower reduced end 42 of a vertical column 45 telescoped, for floating movement in a vertical direction, in a sleeve 50. A bearing 43 is interposed between column 45 and sleeve 50.

The upper end of column 45 is reduced, as at 44, to form a shoulder seating a cap 46 having a tubular axial extension 47 telescoped over column 45. A cylindrical skirt 48 is welded to cap 46 and encloses the enlarged upper end 51 of sleeve 50. Cap 46 is secured on column 45 by means of a collar 49 welded to cap 46 and held in place on column end 44 by a nut and washer assembly 52 on the threaded extension 53 of reduced upper end 44. Ears 54 on cap 46 support reels (not shown) for the wire electrodes 20, 20'.

Cap 46, and thus column 45, are supported in sleeve 50 by means of a coil spring 55 embracing extension 47 and seating on a spring seat 56 supported on a roller bearing 57 supported on a shoulder formed at the junction of enlarged part 51 of sleeve 50 and the lower part of the sleeve.

The outer surface of the lower end of sleeve 50 is formed with a pair of diametrically opposite longitudinally extending grooves 58 which are engageable by the upper end of a latch lever 60 secured intermediate its ends to a shaft 61 pivoted in a pair of ears 62 projecting from split collar 41. A coil spring 63 is seated in the lower end of latch lever 60 and in collar 41 to bias lever 60 to the locking position. An operating handle 65 is secured to one end of shaft 61 to operate lever 60 to the unlatched position, and handle 65 may conveniently be duplicated at the opposite end of shaft 61. By unlatching lever 60, collar 41 and column 45 may be turned 180 degrees about the column axis to reverse the position of welding head 40 and its associated parts relative to the position shown in Fig. 4.

As best seen in Figs. 3 and 5, sleeve 50 is formed with flanged extensions 64, just below enlarged part 51 which are bolted to bridging members 66 forming part of a horizontally floating carriage generally indicated at 70. This carriage comprises a pair of sleeve assemblies 75 interconnected by members 66 and floating on a pair of rods 67 extending through a first plate 68 secured to the end of a horizontal boom 71 and secured in a second annular plate 72 secured on the boom and spaced substantially from plate 68. Boom 71 may be adjustably mounted on a carriage (not shown) arranged to travel parallel to the welding seam, or the work may be moved longitudinally beneath the welding head.

Each sleeve assembly 75, as best seen in Fig. 6, includes a sleeve 73 having reduced threaded ends on which are screwed an end cap 74 and a dust seal cap 76, respectively. Cap 74 has a breather opening 77 and is shouldered to clamp an annular collar 78 against the outer end of sleeve 73. Similarly, dust seal cap 76 is shouldered to clamp an angular cross-section collar 79 against the inner end of sleeve 73.

Sleeve 73 is formed with a plurality, preferably four, of longitudinally extending semi-cylindrical grooves 81 in its inner surface which mate with corresponding grooves 82 in the outer surface of rod 67 within sleeve 73. The outer end of rod 67 is reduced in diameter, as at 83, beyond grooves 82 to the base diameter of the grooves 82, reduced end 83 having a clearance fit through collar 78. The grooves 81, 82 conjointly receive a bearing assembly 80 comprising bearing balls 84 separated by cylindrical spacers 86. Springs 87, also set into grooves 81, 82 engage each end of bearing assembly 80. The springs 87 at the outer end of the assembly seat over pins 88 projecting from collar 78. The springs at the inner end of the assembly seat against disks 89 engaging ring 79. An oil seal, generally indicated at 85, is held against a flange 91 on the inner end of sleeve 73, by a spacer 92 engaging ring 79.

Each sleeve 73 has a radial flange 93 on its inner end in which are threaded studs 90 extending freely through apertures in plate 68 and having heads 94 engageable with plate 68 to limit outward movement of carriage 75. Inward movement of the carriage is limited by the ends of rods 67 abutting end caps 74. The arrangement provides for carriage 75 to have a floating movement of a limited amount, such as 1", to either side of the centered position illustrated in the drawings.

The welding head 40 is adjustably mounted on split collar 41 for both lateral adjustment and adjustment of the angle of the electrodes 20, 20' relative to the work. Collar 41 has a pair of spaced apertured ears 96 projecting rearwardly and downwardly therefrom, and between these ears is a worm gear 95 secured to a shaft 97 extending through the apertures in the ears. A worm 98, operated by a suitable handle or knob (not shown), meshes with gear 95 to rotate this gear and shaft 97. Shaft 97 has a threaded upper end engaged in a nut 99 fixed to a slide 100 movably mounted on an upwardly and outwardly projecting extension 101 of collar 41. When worm 98 is turned, slide 100 will thus be moved longitudinally of extension 101. An apertured ear 102 extends from the upper end of slide 100 and receives a shaft 103 held therein against both rotation and axial movement by a pin 104.

Motor 21 drives the electrode feeding rollers 25, 25' through a gear reduction unit 105 on which the motor is mounted. Unit 105 has a split clamp 106 on its upper wall receiving shaft 103 and tightened by a stud 107. By loosening stud 107, clamp 106 and unit 105 can be rotated relative to shaft 103 and/or adjusted axially therealong, thus providing for angular and lateral adjustment of welding head 40 relative to the welding line or seam.

Electrodes 20, 20' are pressed against their respective feed rollers 25, 25' by pressure rollers mounted in an adjustable pressure roller unit 108 on gear unit 105. The electrodes then pass along contact shoes 23, 23' of the same general nature as those of Figs. 1, 2 and 2A.

Side plates 111 are bolted to opposite surfaces of clamp 41 and extend forwardly and downwardly therefrom. A rectangular housing 110 is mounted between the outer ends of plates 111 by means of threaded studs 112 on housing 110 projecting through apertures in plates 111 and having handle operated nuts 113 threaded on their outer ends.

Housing 110 has a cylindrical bore extending transversely thereof and receiving an internally threaded sleeve 115 having a flange 114 on its lower end engaging housing 110. A collar 116 secured to the other end of sleeve 115 cooperates with flange 114 to retain sleeve 115 in the bore while permitting rotation of the sleeve. Sleeve 115 may be locked against rotation by a stud 117 operated by handle 118 and provided with a lock nut 119.

Sleeve 115 threadedly receives a threaded shaft 120 having a fork 121 on its lower end and a squared upper end 122. A lock nut 123 is provided on shaft 120. A guide wheel 125 is rotatably mounted in fork 121 to guide welding head 40 along the seam to be welded, movement of head 40 to follow wheel 125 being provided by the vertically floating column 45 and the horizontally and laterally floating carriage 70. Wheel 125 may be moved vertically by loosening stud 117 and rotating sleeve 115 by means of a wrench engaged in flange 114, provided lock nut 123 has been loosened. Wheel 125 may be angularly adjusted by loosening nut 113 and turning housing 110 about studs 112.

An arcuate slotted bracket 126 extends rearwardly from fork 121 in overlapping relation with a mating bracket 127 extending forwardly from a welding flux nozzle 130 which is also connected to the axle of guide wheel 125 by a pair of links 128. Studs 131 extend through the slots of brackets 126, 127 and are provided with nuts 132 engaging washers 133. By these means, the position of nozzle 130 relative to guide wheel 125 may be angularly adjusted.

The surface of flux nozzle 130 nearest to contact shoes 23, 23' is provided with dielectric insulating material, as at 134. Nozzle 130 has a passage 136, formed with a flared entrance, which removably seats the lower end of a flux conduit 137 extending from a flux hopper 135 mounted on annular plate 68.

As stated, the welding head 40 follows the variations in the seam to be welded by virtue of its lateral and vertical floating mounting permitting guide wheel 125 to move the head laterally or vertically with ease. The several adjustments provide for accurate centering of the head relative to the work. In addition, by removing conduit 137 from nozzle passage 136 and releasing latch 60, the apparatus may be turned 180 degrees to move along the seam in the opposite direction.

While specific embodiments of the invention have been shown and described in detail to illustrate the application of the invention principles, it will be understood that the invention may be embodied otherwise without departing from such principles.

What is claimed is:

1. A method of fusible metal arc welding comprising the steps of juxtaposing a pair of fusible metal electrodes and a conductive metal workpiece on which metal is to be deposited; connecting the first electrode to the negative terminal of a first source of substantially constant direct current potential; connecting the second electrode to the positive terminal of a second source of substantially constant direct current potential; connecting the positive terminal of said first source and the negative terminal of said second source to each other at a common junction connected to the metal workpiece; establishing arcs between each of said electrodes and the workpiece to fuse metal from the electrodes to coalesce with metal of the workpiece; and conjointly feeding said electrodes toward the workpiece as metal is fused from the arcing ends of said electrodes at relative feeding speeds such that the current flow through said common junction is substantially zero.

2. A method of fusible metal arc welding comprising the steps of juxtaposing a pair of fusible metal electrodes and a conductive metal workpiece on which metal is to be deposited; connecting the first electrode to the negative terminal of a first source of substantially constant direct current potential; connecting the second electrode to the positive terminal of a second source of substantially constant direct current potential; connecting the positive terminal of said first source and the negative terminal of said second source to each other at a common junction connected to the metal workpiece; establishing arcs between each of said electrodes and the workpiece to fuse metal from the electrodes to coalesce with metal of the workpiece; and conjointly feeding said electrodes toward the workpiece as metal is fused from the arcing ends of said electrodes with said first electrode being fed at a speed sufficiently in excess of the feeding speed of said second electrode that the current flow through said common junction is substantially zero.

3. A method as claimed in claim 2 in which the feeding speed of said first electrode is of the order of 40 percent greater than the feeding speed of said second electrode.

4. A method of fusible metal arc welding comprising the steps of juxtaposing a pair of fusible metal electrodes and a conductive metal workpiece on which metal is to be deposited; connecting the first electrode in straight polarity between one terminal of a first source of substantially constant potential direct current and the metal workpiece; connecting the second electrode in reverse polarity between one terminal of a second source of substantially constant potential direct current and the metal workpiece; connecting the other terminal of said sources to a common junction connection to the workpiece; establishing arcs between each of said electrodes and the workpiece to fuse metal from the electrodes to coalesce with metal of the workpiece; conjointly feeding said electrodes toward the workpiece as metal is fused from the arcing ends of said electrodes at relative feeding speeds such that the current flow through said common junction is substantially zero; and advancing the electrodes along the workpiece with the reverse polarity electrode slightly in advance of the straight polarity electrode to supply preheat to the latter.

5. Welding apparatus comprising, in combination first and second sources of substantially constant potential direct current; first and second fusible metal welding electrodes; circuit means electrically connecting said first electrode to the negative terminal of said first source; circuit means electrically connecting said seond electrode to the positive terminal of said second source; circuit means connecting the positive terminal of said first source and the negative terminal of said second source to a common junction connected to the fusible metal work to be welded; and electrode feeding means operable to conjointly feed said electrodes toward the workpiece, with the feeding rate of said first electrode being sufficiently in excess of the feeding rate of said second electrode that the current flow through said common junction is substantially zero.

6. A method of fusible metal arc welding comprising the steps of juxtaposing a pair of fusible metal electrodes and a conductive metal workpiece on which metal is to be deposited; connecting the first electrode in straight polarity between one terminal of a first source of substantially constant potential direct current and the metal workpiece; connecting the second electrode in reverse polarity between one terminal of a second source of substantially constant potential direct current and the metal workpiece; connecting the other terminals of said sources to a common junction connected to the workpiece; establishing arcs between each of said electrodes and the workpiece to fuse metal from the electrodes to coalese with metal of the workpiece; conjointly feeding said electrodes toward the workpiece as metal is fused from the arcing ends of said electrodes; and depositing metal from said straight polarity electrode at a rate sufficiently in excess of the rate of metal deposit from said reverse polarity electrode that the current flow through said common junction is substantially zero.

7. A method of fusible metal arc welding comprising the steps of juxtaposing a pair of fusible metal electrodes on which metal is to be deposited; interposing between the electrodes and the workpiece granular submerged arc type welding flux having a fineness of from 30 x 150 mesh to 50 x 150 mesh; connecting the first electrode in straight polarity between one terminal of a first source of substantially constant potential direct current and the metal workpiece; connecting the second electrode in reverse polarity between one terminal of a second source of substantially constant potential direct current and the metal workpiece; connecting the other terminals of said sources to a common junction connected to the workpiece; establishing arcs between each of said electrodes and the workpiece to fuse the flux and to fuse metal from the electrodes to coalesce with metal of the workpiece; and conjointly feeding said electrodes toward the workpiece through the flux as metal is fused from the arcing ends of said electrodes.

8. A method of fusible metal arc welding comprising the steps of juxtaposing a pair of fusible metal electrodes and a conductive metal workpiece on which metal is to be deposited interposing between the electrodes and the workpiece granular submerged arc type welding flux having a fineness of the order of 40 x 150 mesh; connecting the first electrode in straight polarity between one terminal of a first source of substantially constant potential direct current and the metal workpiece; connecting the second electrode in reverse polarity between one terminal of a second source of substantially constant potential direct current and the metal workpiece; connecting the other terminals of said sources to a common junction connected to the workpiece; establishing arcs between each of said electrodes and the workpiece to fuse the flux and to fuse metal from the electrodes to coalesce with metal of the workpiece; and conjointly feeding said electrodes toward the workpiece through the flux as metal is fused from the arcing ends of said electrodes.

9. A method of fusible metal arc welding comprising the steps of juxtaposing a pair of fusible metal electrodes on which metal is to be deposited; interposing between the electrodes and the workpiece granular submerged arc type welding flux having a fineness of from 30 x 150 mesh to 50 x 150 mesh; connecting the first electrode in straight polarity between one terminal of a first source of substantially constant potential direct current and the metal workpiece; connecting the second electrode in reverse polarity between one terminal of a second source of substantially constant potential direct current and the metal workpiece; connecting the other terminals of said sources to a common junction connected to the workpiece; establishing arcs between each of said electrodes and the workpiece to fuse the flux and to fuse metal from the electrodes to coalesce with metal of the workpiece; conjointly feeding said electrodes toward the workpiece through the flux as metal is fused from the arcing ends of said electrodes; and conjointly moving the electrodes along the workpiece in spaced parallel paths.

10. Welding apparatus comprising, in combination first and second sources of substantially constant potential direct current; first and second fusible metal welding electrodes; circuit means electrically connecting said first electrode to the negative terminal of said first source; circuit means electrically connecting said second electrode to the positive terminal of said second source; circuit means connecting the positive terminal of said first source and the negative terminal of said second source to a common junction connected to the fusible metal work to be welded; and motor driven electrode feeding means having an output shaft and a pair of feed rollers on said output shaft each engaged with one of said electrodes for conjointly feeding said electrodes toward the workpiece; the diameter of the feed roller engaging said first electrode being greater than the diameter of the feed roller engaging said second electrode.

11. Welding apparatus as claimed in claim 10 in which the diameter of the feed roller engaging said first electrode is of the order of 40 percent greater than the diameter of the feed roller engaging said second electrode.

12. Welding apparatus comprising, in combination, first and second sources of substantially constant potential direct current; first and second substantially continuous fusible metal welding electrodes; a pair of relatively elongated conductive metal contact shoes arranged in closely spaced, substantially parallel relation, and each formed with passage means therethrough receiving one of said electrodes; a relatively thin dielectric member interposed between said contact shoes; a pair of electrode guides each adjustably mounted on the exit end of a contact shoe for relative lateral adjustment to preset the lateral spacing of the electrodes; circuit means electrically connecting the contact shoe engaged with said first electrode to the negative terminal of said first source; circuit means electrically connecting the contact shoe engaged with said second electrode to the positive terminal of said second source; circuit means connecting the positive terminal of said first source and the negative terminal of said second source to a common junction connected to the fusible metal work to be welded; and motor driven electrode feeding means having an output shaft and a pair of feed rollers on said output shaft each engaged with one of said electrodes for conjointly feeding said electrodes toward the workpiece.

13. Welding apparatus comprising, in combination, a substantially horizontally extending support; a carriage movably mounted on said support for limited floating movement therealong; a substantially vertically extending column movably mounted on said carriage for limited floating vertical movement relative to said carriage; guiding means mounted on the lower end of said column for guiding engagement with fusible metal work to be welded; first and second substantially continuous fusible metal welding electrodes; motor driven electrode feeding means mounted on the lower end of said column, and having an output shaft and a pair of feed rollers on said output shaft each engaged with one of said electrodes for conjointly feeding said electrodes toward the workpiece; an electrical contact unit for said electrodes, mounted on said feeding means, and including a pair of relatively elongated conductive metal contact shoes arranged in closely spaced, substantially parallel relation and each formed with passage means therethrough receiving one of said electrodes, a relatively thin dielectric member interposed between said contact shoes, and a pair of electrode guides each adjustably mounted on the exit end of a contact shoe for relative lateral adjustment to pre-set the lateral spacing of the electrodes; said contact unit extending toward the work; a bracket mounted on said guiding means and extending rearwardly toward said contact unit; a flux discharge nozzle mounted on said bracket between said guiding means and contact unit; a hopper mounted on said support and adopted to contain a supply of submerged arc type welding flux; and a conduit connecting a discharge outlet of said hopper to said nozzle.

14. Welding apparatus as claimed in claim 13 in which said column is cylindrical and is floatingly suspended in a guide sleeve on said carriage; said column being rotatable about its axis to reverse the relative orientation of said guiding means and said feeding means with respect to the work; and means for releasably locking said column relative to said sleeve in either of a pair of diametrically opposite positions.

15. Welding apparatus as claimed in claim 13 in which the lower end of said conduit is disengageably seated in a recess in said nozzle.

16. Welding apparatus as claimed in claim 13 in which the diameter of the feed roller engaging said first electrode is of the order of 40 percent greater than the diameter of the feed roller engaging said second electrode.

References Cited in the file of this patent
UNITED STATES PATENTS

| | | |
|---|---|---|
| 2,147,461 | Schroeder | Feb. 14, 1939 |
| 2,489,002 | Babbitt | Nov. 22, 1949 |
| 2,527,336 | Schaefer | Oct. 24, 1950 |
| 2,658,162 | Tichenor et al. | Nov. 3, 1953 |
| 2,756,311 | Persson et al. | July 24, 1956 |

FOREIGN PATENTS

| | | |
|---|---|---|
| 1,123,792 | France | June 18, 1956 |